(12) United States Patent
Gaile et al.

(10) Patent No.: US 9,890,767 B2
(45) Date of Patent: Feb. 13, 2018

(54) WIND ENERGY SYSTEM WITH A PITCH ADJUSTMENT SYSTEM

(71) Applicant: Liebherr-Components Biberach GmbH, Biberach an der Riss (DE)

(72) Inventors: Anton Gaile, Leutkirch (DE); Anton Staimer, Babenhausen (DE); Oliver Wennheller, Leutkirch (DE); Hans-Peter Lavergne, Trunkelsberg (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 405 days.

(21) Appl. No.: 14/413,818

(22) PCT Filed: Jul. 10, 2013

(86) PCT No.: PCT/EP2013/002035
§ 371 (c)(1),
(2) Date: Jan. 9, 2015

(87) PCT Pub. No.: WO2014/009011
PCT Pub. Date: Jan. 16, 2014

(65) Prior Publication Data
US 2015/0152842 A1    Jun. 4, 2015

(30) Foreign Application Priority Data

Jul. 11, 2012   (DE) ................. 10 2012 013 767

(51) Int. Cl.
*F03D 7/02*     (2006.01)
*F15B 15/26*    (2006.01)
(Continued)

(52) U.S. Cl.
CPC ............ *F03D 7/0224* (2013.01); *F03D 9/25* (2016.05); *F03D 80/88* (2016.05); *F15B 1/022* (2013.01);
(Continued)

(58) Field of Classification Search
CPC ... F03D 7/022; F03D 7/0224; F05B 2270/604
See application file for complete search history.

(56) References Cited

U.S. PATENT DOCUMENTS 2,856,960 A   10/1958   Stacey
3,698,432 A   10/1972   Kutz
(Continued)

FOREIGN PATENT DOCUMENTS

DE        2252935 A1    5/1973
DE    202005018038 U1    1/2006
(Continued)

OTHER PUBLICATIONS

ISA European Patent Office, International Search Report of PCT/EP2013/002035, dated Jan. 9, 2014, WIPO, 6 pages.

*Primary Examiner* — Craig Kim
*Assistant Examiner* — Michael Sehn
(74) *Attorney, Agent, or Firm* — McCoy Russell LLP

(57) ABSTRACT

The invention relates to a wind energy system with at least one pitch adjustment system for adjusting the pitch of at least one rotor blade of the wind energy system, wherein the pitch adjustment system comprises at least one electrohydraulic drive that comprises an unregulated electromotor rotating in one direction of rotation for generating pressure.

10 Claims, 14 Drawing Sheets

(51) Int. Cl.
  *F15B 1/02* (2006.01)
  *F15B 15/18* (2006.01)
  *F03D 80/80* (2016.01)
  *F03D 9/25* (2016.01)

(52) U.S. Cl.
  CPC ............ F15B 15/18 (2013.01); F15B 15/261 (2013.01); *F05B 2210/11* (2013.01); *F05B 2270/604* (2013.01); *F15B 2015/268* (2013.01); *F15B 2211/20515* (2013.01); *F15B 2211/20576* (2013.01); *F15B 2211/212* (2013.01); *F15B 2211/3051* (2013.01); *F15B 2211/411* (2013.01); *F15B 2211/41554* (2013.01); *F15B 2211/41563* (2013.01); *F15B 2211/426* (2013.01); *F15B 2211/7053* (2013.01); *F15B 2211/7054* (2013.01); *F15B 2211/8752* (2013.01); *Y02E 10/721* (2013.01); *Y02E 10/723* (2013.01)

(56) References Cited

U.S. PATENT DOCUMENTS

| | | | |
|---|---|---|---|
| 3,903,698 A | 9/1975 | Gellatly et al. | |
| 6,796,120 B2* | 9/2004 | Franchet | F15B 7/006 60/413 |
| 2010/0232964 A1* | 9/2010 | Geiger | F03D 7/0224 416/156 |

FOREIGN PATENT DOCUMENTS

| | | |
|---|---|---|
| DE | 202007006789 U1 | 7/2007 |
| EP | 0306530 A1 | 3/1989 |
| EP | 1306558 A1 | 5/2003 |
| EP | 1306560 A1 | 5/2003 |
| FR | 2146333 A1 | 3/1973 |
| GB | 1374752 A | 11/1974 |
| WO | 9960273 A1 | 11/1999 |
| WO | 2009064264 A1 | 5/2009 |

* cited by examiner

WIND ENERGY SYSTEM WITH A PITCH ADJUSTMENT SYSTEM

CROSS REFERENCE TO RELATED APPLICATIONS

This application is the United States National Phase of International Patent Application Serial No. PCT/EP2013/0002035, entitled "WIND TURBINE COMPRISING A PITCH ADJUSTMENT SYSTEM" filed Jul. 10, 2013, which claims priority to German Patent Application No. 10 2012 013 767.2, entitled "WIND TURBINE COMPRISING A PITCH ADJUSTMENT SYSTEM" filed Jul. 11, 2012, the entire contents of each of which are hereby incorporated by reference in their entirety for all purposes.

TECHNICAL FIELD

The present invention relates to a wind energy system with a pitch adjustment system for adjusting at least one rotor blade of the wind energy system and to a pitch adjustment system for a wind energy system. The rotor blade adjustment of wind energy systems is also called a pitch adjustment system. The rotor blade adjustment in a wind energy system (WEA) serves to regulate the speed of the rotor at rising wind speeds. If the so-called nominal wind speed is exceeded, the rotor blades are rotated or pitched out of the wind by a control logic. The maximum pivot angle here is approximately 90°, which corresponds to the so-called feathered position. This position is utilized to maintain the rotor upon reaching the cut-off speed. Wind energy systems are equipped as a rule with three rotor blades, wherein each rotor blade is equipped with an adjustment system. The term individual rotor blade adjustment is also used in this connection. Such pitch systems are as a rule hydraulic systems or electrical systems. In hydraulic pitch adjustment systems the rotor blade has a non-toothed blade support that can be pivoted with a hydraulic pivot cylinder. The axial movement produced by the hydraulic pivot cylinder is transmitted via an articulated plate mounted on the large rolling bearing or blade support into a rotary movement of a support part and therefore of the rotor. The electrical energy for the control of the hydraulic pivot cylinder is transmitted via slip ring bodies from the machine housing into the rotor. In addition, rotary transmission leadthroughs are used via which the hydraulic energy can be transmitted from the machine housing with the hydraulic unit centrally arranged there into the rotor.

BACKGROUND AND SUMMARY

As a consequence of the hydraulic adjustment, the toothed engagements are completely eliminated, which, however, is already the case today in existing hydraulic systems. The disadvantage resides in the central hydraulic system in the machine housing of the wind energy system and of the supply line into the rotor resulting from it. The interface between the machine housing and the rotor must be constructed with expensive rotary transmission leadthroughs. Therefore, the hydraulic supply must be must be run through the entire main transmission, which makes correspondingly expensive hollow shafts absolutely necessary.

In the known electrical systems blade supports with outer cogging or inner cogging are used in combination with a pivot drive. There are solutions in which the cogging is replaced by belt drives. The torque produced by an electromotor is transmitted via a planet transmission with a drive pinion onto the cogging of the blade support of the rotor blade, as a result of which a pivot movement of the rotor blade is induced. The electromotor is electrically connected into the rotor. The electrical energy is then transmitted via slip ring bodies from the machine housing into the rotor.

However, in electrical systems based on an adjustment via rotary drives the problem regarding the formation of wear on the cogging constantly reoccurs on account of the fact that an only small adjustment angle pitch is present in particular in the so-called 0° position, that is, the adjustment position between the cut-in wind speed and the nominal wind speed.

A wind energy system is already known from WO 2009/064264 that comprises a pitch adjustment system with an electrohydraulic drive, wherein the components of the electrohydraulic drive are arranged in the rotor of the wind energy system. The arrangement of the electrohydraulic drive in the hub or the rotor can eliminate a hydraulic leadthrough through the rotary connection between the hub and the rotor and the pod. The electrical motor in this known electrohydraulic arrangement is regulated or controlled in such a manner that the volume current of the hydraulic fluid can be adjusted as a function of the motor regulation or motor control. Furthermore, this previously known wind energy system already comprises a hydraulic reservoir via which the rotor blade is brought into a secure position in case of a system error.

The current electromechanical adjustment systems according to the prior art and the previously cited electrohydraulic actuators require an expensive electronic performance system. In the available systems no compact solution has yet been realized that comprises all necessary functions such as regulating operation, emergency pitching out in case of a current outage and a mechanical locking in a secure position.

The present invention therefore has the problem of further developing a wind energy system of the initially cited type in an advantageous manner, in particular in such a manner that a wind energy system is equipped with a compact and functionally reliable pitch system without an expensive electronic performance system.

This problem is solved in accordance with the invention by a wind energy system with the features of claim 1, that provides that a wind energy system is made available with at least one pitch adjustment system for adjusting the pitch of at least one rotor blade of the wind energy system, wherein the pitch adjustment system comprises at least one electrohydraulic drive with at least one hydraulic cylinder, at least one hydraulic reservoir, at least one adjustment valve, at least one electromotor pump unit and at least one control unit in which at least the hydraulic components including the at least one hydraulic cylinder and the at least one hydraulic reservoir are combined in a device and are arranged in it or on the rotor of the wind energy system, wherein the electrohydraulic drive comprises at least one electromotor rotating in one direction of rotation in an unregulated manner for generating pressure.

The unregulated electromotor with only one direction of rotation can advantageously drive one or more pumps. The using of several pumps makes possible an actuator adjustment with different adjustment speeds, as a consequence of which the motor drive moment can be reduced at high loads.

Preferred embodiments of the invention result from the subclaims following the main claim.

According to the above, the hydraulic cylinder of the electrohydraulic drive can comprise a lock in such a manner that at least one locking bolt engages into at least one recess in the piston rod. As a result of this locking in the piston rod, the external locks that are otherwise customary can be eliminated. The at least one locking bolt can be advantageously provided with a position recognition system for detecting its position.

According to another advantageous embodiment of the invention the mechanism for loosening the locking can be directly coupled to the pressure of a hydraulic reservoir in such a manner that the loosening of the lock only takes place when the hydraulic reservoir is charged to a given pressure. As a result an additional valve can also be eliminated.

In order to be able to regulate different adjustment speeds at least two pumps driven by a motor can be provided that can be cut in and out via switchable bypass valves.

The at least one other pump can only be cut in if the external load present is below a given threshold value.

It is quite especially preferred in the operation of the adjustment cylinder if a cylinder chamber is connected to the pump while the other cylinder chamber is connected to a reservoir.

A special advantage results in the present invention if at least one reservoir is charged to a pressure that is elevated in comparison to the pressure level of the hydraulic system for moving the at least one blade into a secure position. This creates a fail-safe system so that even in the case of a stoppage of the control- and energy supply unit present in the machine room the pitch system can be activated in order to rotate the rotor blades out of the wind.

An especially compact structure of the electrohydraulic actuator results if all hydraulic components are arranged on the central valve plate or are at least connected to each other by the latter.

The electromotor as well as the hydraulic pump can advantageously be built into the pre-tensioned tank of the hydraulic reservoir. As a consequence, the engine can be liquid-cooled and on the whole built to be smaller.

According to another embodiment of the invention an additional support bearing with low rigidity is constructed on the bottom of the electrohydraulic actuator in such a manner that the axial forces of the hydraulic cylinder of the actuator are introduced via the main support into the hub structure, wherein the additional support bearing receives only the components of the forces of weight and/or of mass that bring about a torque about the axis of the hydraulic cylinder.

The wind energy system can comprise at least two rotor blades, that are arranged on the rotor. A hydraulic adjustment unit can be associated with each rotor blade.

The invention furthermore relates to a pitch adjustment system for a wind energy system with the features of the pitch adjustment system in accordance with one of the previous claims.

Further details and advantages of the invention will now be explained in detail using an exemplary embodiment shown in the drawings.

DETAILED DESCRIPTION

Figure 1:
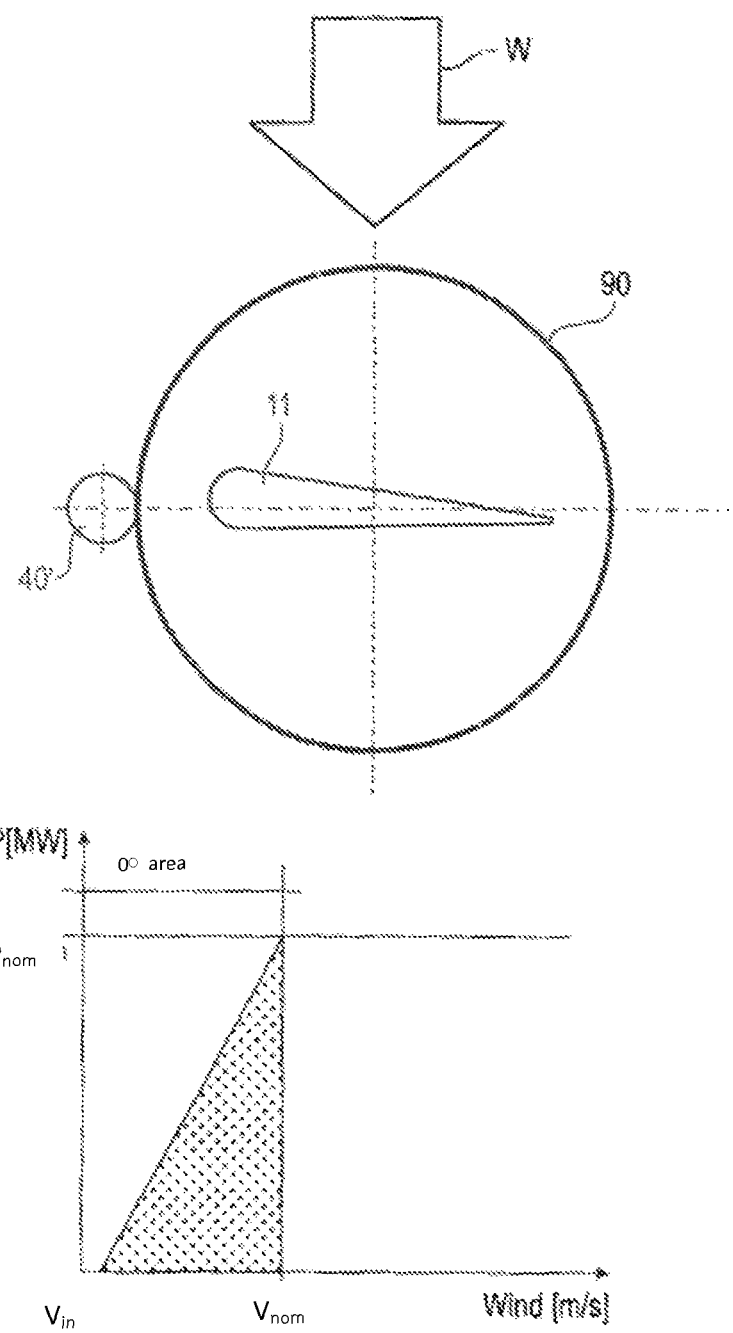
FIG. 1 shows a schematic view of the rotor blade adjustment under rising wind strength in a first position.

FIG. 1 shows a schematic view of the rotor blade adjustment of the rotor blade 11 or rotor vane 11. The rotor blade 11 shown in FIG. 1 is in a position that is designated as the 0° area, as can be seen from the diagram contained in FIG. 1. The rotor blade 11 can be adjusted by the pitch adjustment 40', that attacks the blade support 90.

Figure 2:
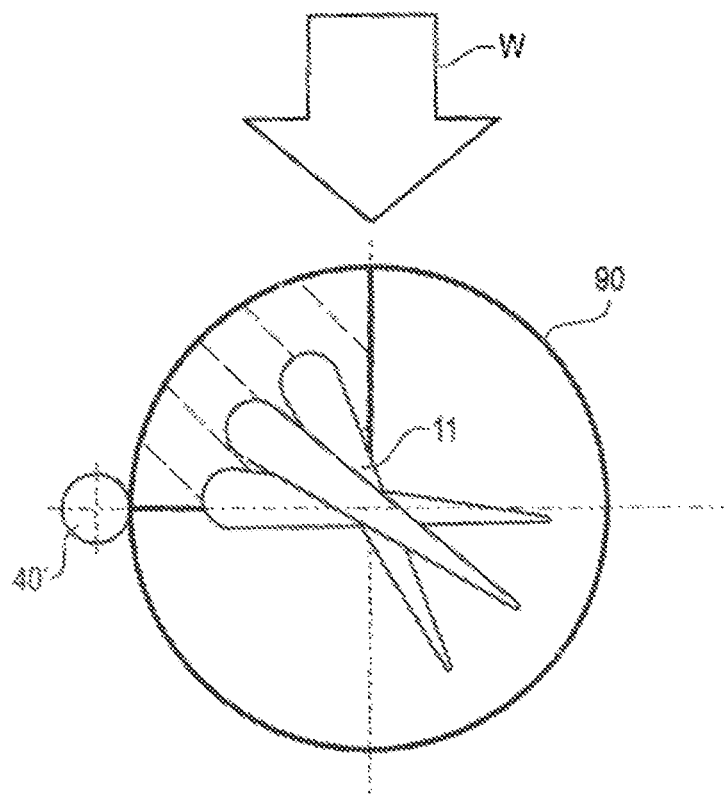
FIG. 2 shows a schematic view of the rotor blade adjustment under rising wind strength in the schematic view of the rotor blade adjustment under rising wind strength in the second position.
Figure 2:
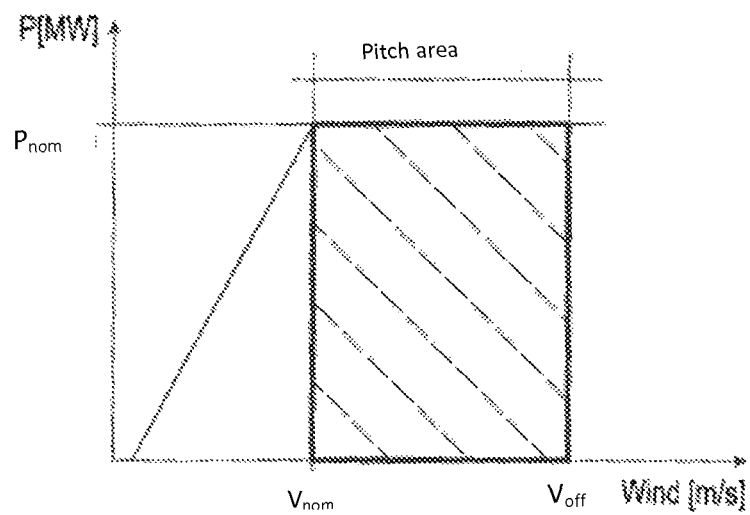

Such an adjustment in rising wind strength is shown in FIG. 2, wherein the so-called "pitch area" is shown in the diagram shown in dotted lines at the bottom of FIG. 2 and also in the schematic view of the rotor blade 11. The wind is designated in the FIGS. 1 and 2 with the reference numeral W.

Figure 3:
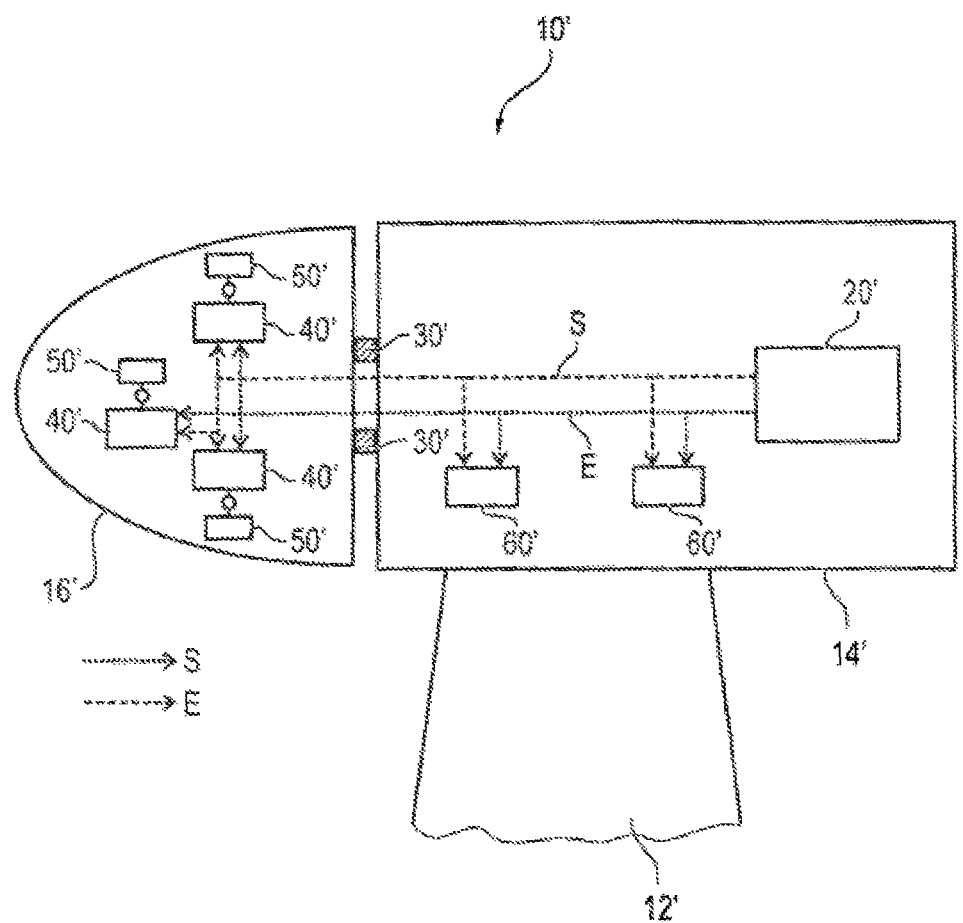
FIG. 3 shows a schematic view onto the upper part of a wind energy system with an electrical pitch adjustment system.

FIG. 3 shows a known wind energy system 10' with an electrical pitch adjustment system 40'. The machine housing 14' of the wind energy system 10' is mounted here on the tower 12'. The system control 20' is centrally arranged in the machine housing 14' and is therefore relatively simple to access. A supplying with energy E and with signals S to the pitch adjustment systems 40' but also to the azimuth control 60' is make available by the system control 20'. The azimuth control 60' is arranged on the bottom of the machine housing 14' and allows a tracking of the machine housing 14' and of the rotor 16' according to the direction of the wind.

The transmission of the signals S and of the energy E from the system control 20' in the machine housing 14' in the rotor 16' takes place via the slip ring 30', that allows the supplying with signals S and energy E to be ensured even with a rotating rotor 16'. The pitch adjustment is an electrical pitch adjustment that comprises a storage battery as fail-safe system 50'. Each individual rotor blade is associated with its own pitch adjustment 40'; however, the rotor blades are not shown in FIG. 3.

Figure 4:
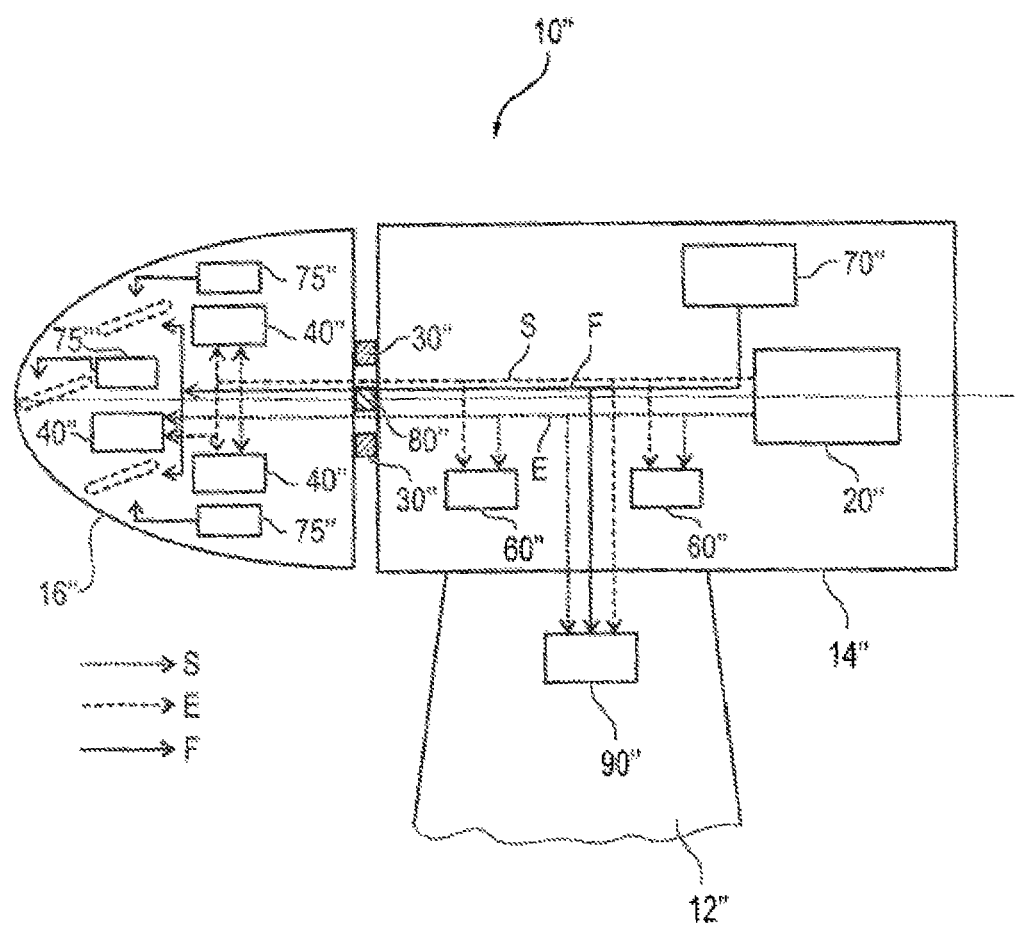
FIG. 4 shows a schematic view onto the upper part of a wind energy system with a hydraulic pitch adjustment system.

FIG. 4 shows a known wind energy system 10" constructed comparably to the wind energy system 10' shown in FIG. 3. In particular, comparable components such as the system control 20" and the azimuth control 60" are present. Here too, the system control 20" is arranged in the machine housing 14" of the wind energy system 10". A tracking of the machine housing 14" and of the rotor 16" can take place according to the direction of the wind by the azimuth controls 60", and therefore a relative movement opposite the stationary tower 12" can take place. Furthermore, an azimuth brake 90" is present.

Energy E and signals S from the system control 20" are transmitted via the slip ring 30" into the pitch controls 40 "arranged in the rotor 16". However, these pitch controls 40" are hydraulic actuators that additionally require a supplying with hydraulic fluid F. To this end a hydraulic unit 70" is centrally arranged in the machine housing 14". The hydraulic supplying with hydraulic fluid F takes place in this instance via the rotary transmission leadthrough fluid coupling 80", that can be realized in the form of a passage such as a hollow shaft in the transmission of the wind energy system 10".

Here too, each individual rotor blade, that is not shown in detail, is associated with the pitch adjustment 40". A pressure reservoir 75" is provided here as a fail-safe system by means of which, for example, the rotor blades 11, that are not shown in detail, can be rotated out of the wind.

The system with a hydraulic pitch adjustment shown in FIG. 4 has the advantage that the individual pitch adjustment systems 40" can be constructed in such a manner that it is sufficient to open only a single control valve in order, for example, to be able to rotate the rotor blades out of the wind. However, this has the disadvantage that due to the hydraulic unit 70" arranged in the machine housing 14" a fluid coupling 80" must be provided, which is very expensive.

Such a fluid coupling 80" is not necessary in the system of a wind energy system 10" shown in FIG. 3 since here only a slip ring 30" for transmitting energy E and signals S from the system control 20" is needed. However, here the pitch adjustment systems 40" are constructed considerably more complexly in order to be able to ensure the required accuracy and secureness of the pitch adjustment.

Figure 5:
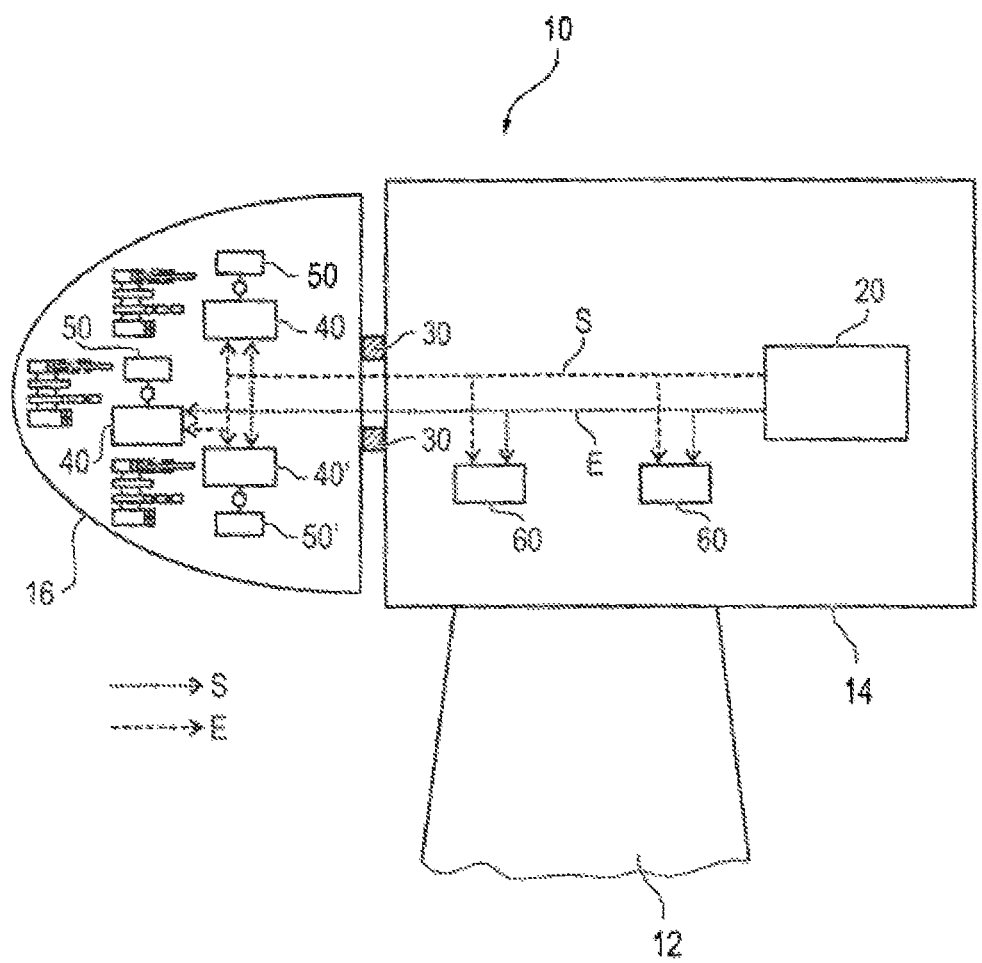
FIG. 5 shows a schematic view onto the upper part of a wind energy system with a pitch adjustment system according to the invention.

The concept of a wind energy system 10 according to the invention and shown in FIG. 5 connects the advantages of the previously known concepts of an electrical pitch adjustment 40' according to FIG. 3 and of a hydraulic pitch adjustment 40" according to FIG. 4.

In the wind energy system 10 in accordance with the invention it also comprises a stationary tower 12 and a machine housing 14 that can rotate by means of the azimuth controls 60 relative to the tower 12. The rotor 16 is rotatably supported on the machine housing 14. Furthermore, the system control 20 is centrally and accessably arranged in the machine housing 14, wherein the azimuth controls 60 and the hydraulic adjustment units 40 of the pitch adjustment system can be supplied with signals S and energy E by the system control 20. The transmission of signals S and energy E into the rotor 16 takes place via the slip ring 30. The central hydraulic supply by the hydraulic unit 70", as is the case for the wind energy system according to FIG. 4, can be eliminated by the division into three decentralized hydraulic adjustment units 40, that are all arranged in the rotor 16.

Consequently, a rotary transmission leadthrough of hydraulic lines from the machine housing 14 into the rotor 16 is also not required. The hydraulic adjustment units 40 are electrically operated, i.e., energy E and signals S can be conducted from the system control 20 to the particular hydraulic adjustment units 40 of the pitch adjustment system by appropriate signal supply lines and energy supply lines that also comprise the slip ring 30. Therefore, hydraulic adjustment units 40 of the pitch adjustment system are concerned that are electrically operated and electrically controlled.

Each hydraulic adjustment unit 40 is associated with an energy reservoir 50 as a fail-safe system.

Figure 6:
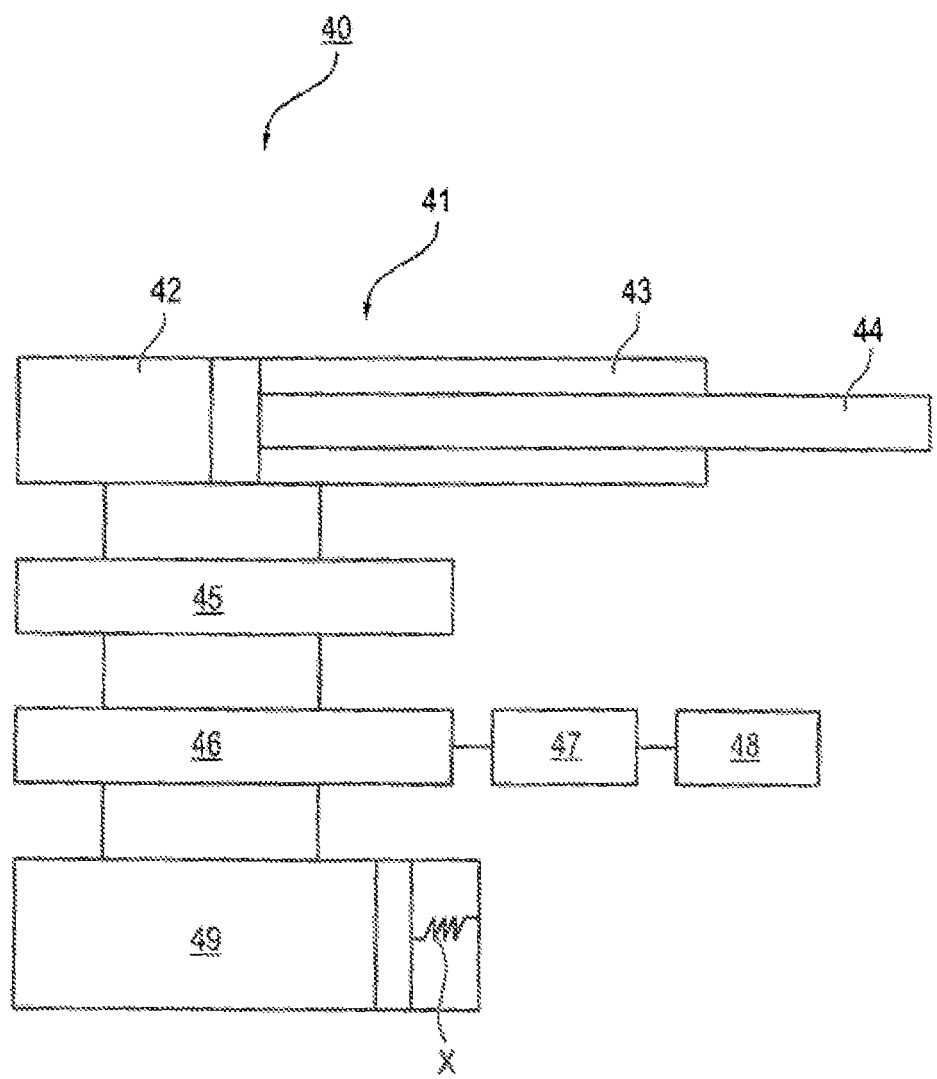
FIG. 6 shows a schematic view of a hydraulic adjustment unit in a first embodiment.

A first embodiment of such a hydraulic adjustment unit 40 is shown in FIG. 6 in a schematic view. This concerns an embodiment with a differential cylinder 41 comprising a piston chamber 42 and an annular chamber 43. The adjustment of the rotor blade 11 can take place by the piston rod 44, which is not, however, shown in detail in FIG. 6. The corresponding control of the differential cylinder 41 takes place by tank 49 for the hydraulic fluid, pump 46 and a control block with valve 45. The pump 46 is driven by a motor 47 that receives appropriate motor control signals via the control 48. Pump 46 and motor 47 can also be designated as an electromotor pump unit. Since the rotating rotor 16 does not make any defined operating position of the hydraulic adjustment unit 40 possible, the tank 49 is loaded in the exemplary embodiment shown in FIG. 6 by a spring power or a spring pressure X so that no air can pass into the hydraulic circuit. It is basically also conceivable that instead of a spring pressure a loading with gas pressure takes place.

Figure 7:
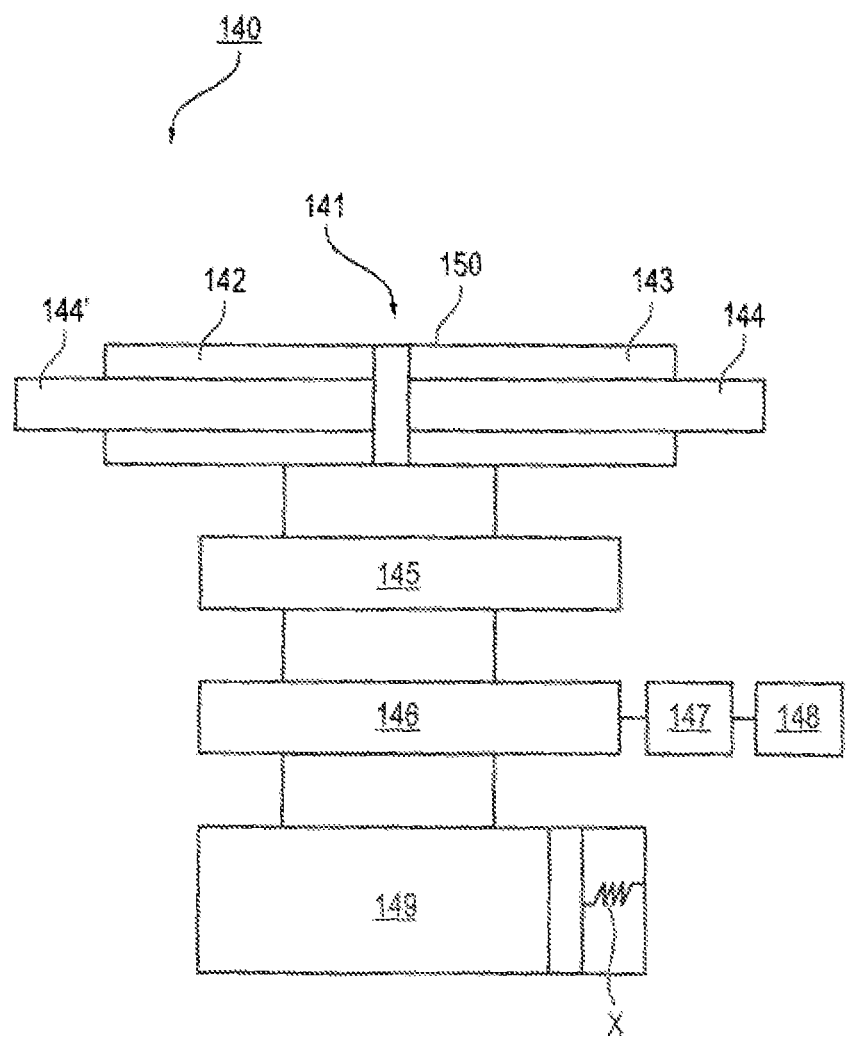
FIG. 7 shows a schematic view of a hydraulic adjustment unit in a second embodiment.

FIG. 7 shows another exemplary embodiment of a hydraulic adjustment unit 140 of a pitch adjustment system in accordance with the invention that can be used, for example, instead of the hydraulic adjustment unit 40 according to FIG. 5. The hydraulic adjustment unit 140 is an adjustment unit with a synchronous cylinder 141 comprising a first piston chamber 142 and a second piston chamber 143. The piston rod ends 144, 144' travel in and out of the synchronous cylinder 141 in correspondence with the filling of the piston chambers 142, 143.

Otherwise, the hydraulic adjustment unit 140 is constructed analogously to the adjustment unit 40 according to FIG. 6. Here too, a tank 149, a pump 146 and a control block with valve 145 are provided as a hydraulic system. Likewise, the pump 146 is driven by a motor 147, wherein pump 146 and motor 147 can be designated as an electromotor pump unit and wherein the motor 147 is controlled via the control 148. Just as in the case of the tank 49 according to the hydraulic adjustment unit 40 in FIG. 6, a spring pressure X is also provided here so that no air can pass into the hydraulic circuit of the hydraulic adjustment unit 140. The FIGS. 8 to 11 show arrangement variants of the cylinder 41 and 141 of the hydraulic adjustment units 40 and 140.

Figure 8:
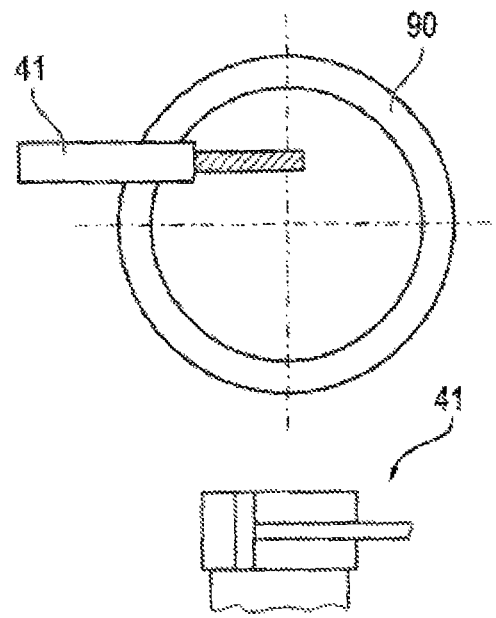
FIG. 8 shows a first variant of the arrangement of the hydraulic cylinder relative to the blade support of the rotor blade.

FIG. 8 shows a first variant in which a differential cylinder 41 is used and the axial movement that can be generated by the differential cylinder 41 is converted into a rotary movement by an articulated plate that is not shown in detail and is on the large roller bearing 90, that is the blade support 90 of the rotor blade 11. As results from FIG. 8, the stroke path of the differential cylinder 41 and/or of the piston of this differential cylinder 41 should be selected in such a manner that the entire desired blade adjustment area of 0° to 90° can be completely traveled through.

Figure 9:
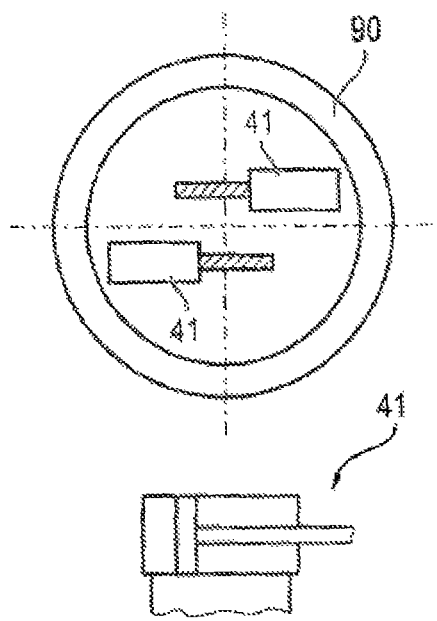
FIG. 9 shows a second variant of the arrangement of the hydraulic cylinder relative to the blade support of the rotor blade.
Figure 10:
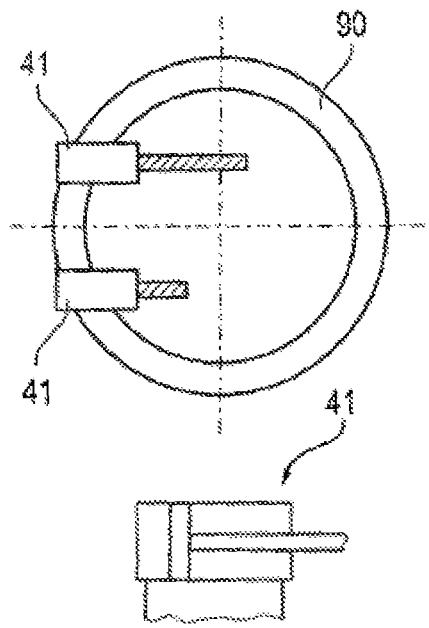
FIG. 10 shows a third variant of the arrangement of the hydraulic cylinder relative to the blade support of the rotor blade.

If it should be necessary to use differential cylinders with a small laid length, another variant should be selected in such a manner, as is shown in FIG. 9, that two differential cylinders 41 are selected. They can be arranged running in the same direction, as shown in FIG. 9, or, however, they can be arranged running in opposite directions, as shown in FIG. 10. In the arrangement according to FIG. 10 a hydraulic connection like the following is advantageous: The piston chamber 42 of the one differential cylinder 41 is hydraulically connected to the annular chamber 43 of the other differential cylinder 41. They convert together the axial movement into a rotary movement of the rotor blade 11 via an articulated plate on the blade 90, which plate is not shown in detail. The main advantage of this hydraulic connection is the avoidance of differential volumes. Therefore, the tank 49 required for the hydraulic adjustment unit 40 can be minimized, which is advantageous for the construction size and the weight.

Figure 11:
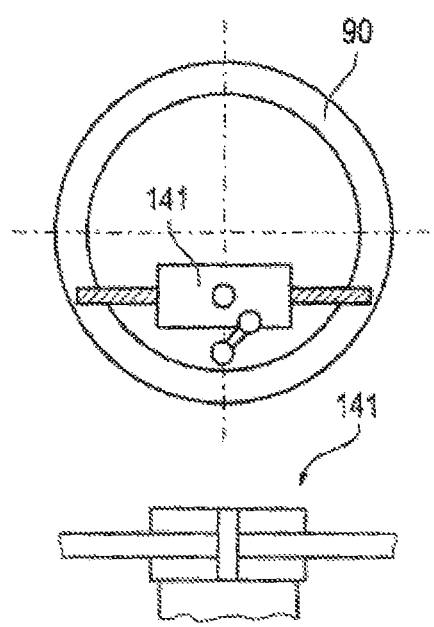
FIG. 11 shows a fourth variant of the arrangement of the hydraulic cylinder relative to the blade support of the rotor blade.

Another embodiment consists in that a synchronous cylinder 141 as shown in FIG. 11 is used. As a consequence of the moving in and out of the piston rod ends 144, 144', that are articulated to articulated points or articulated plates of the large rolling bearing 90, an adjustment of the rotor blade 11 (cf. FIGS. 1 and 2), that is not shown in detail, can take place just as in the embodiments according to FIGS. 8 to 10. The piston rod ends 144 and 144' are fixed at articulation points on the stationary part of the large rolling bearing 90. As a consequence of the back and forth travel of the cylinder 150 (cf. FIG. 7) an adjustment of the rotor blade 11 (cf. FIGS. 1 and 2), that is not shown in detail) can take place via a connecting rod or a pin. With the aid of the connecting rod the axial movement of the cylinder 150 is converted into a rotary movement of the rotor blade 11 by an articulated plate on the blade support 90, which plate is not shown in more detail.

With the aid of the pin the axial movement of the cylinder 150 is converted by a crank, not shown in more detail, on the blade support 90 into a rotary movement of the rotor blade 11.

This results in particular in the following advantages: The two piston chambers 142 and 143 have the same size and no differential oil volumes are produced. Therefore, the tank 49 required for the hydraulic adjustment unit 40 can be minimized, which is advantageous for the construction size and weight.

The oil supply can take place selectively via the cylinder 150 or the stationary piston rod ends 144 and 144'.

The installation position of the synchronous cylinder 141 is independent of the direction of rotation of the rotor blade 11 since it has the same force on both sides.

Figure 12:
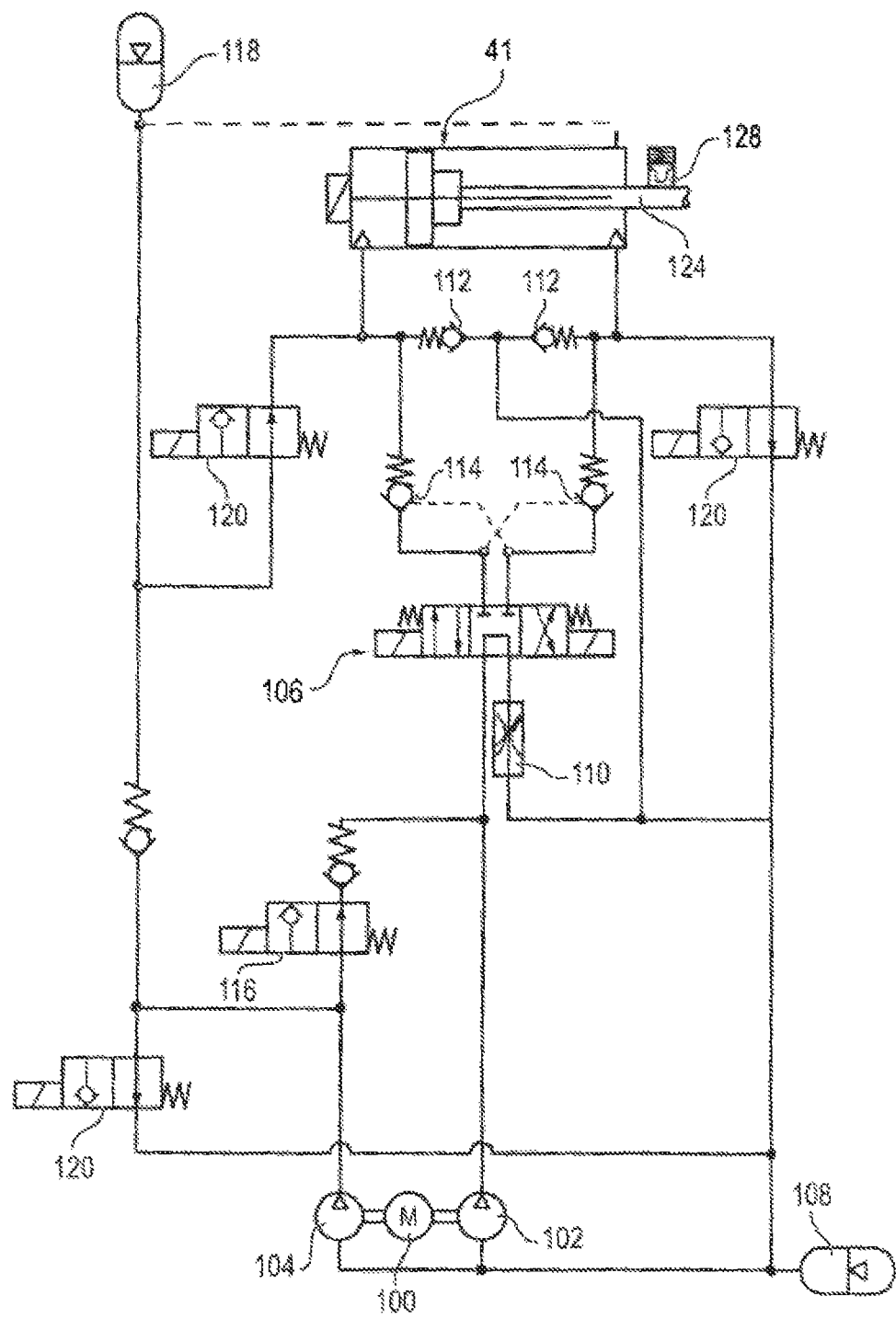
FIG. 12 shows a hydraulic scheme of the electrohydraulic actuator according to the invention.

FIG. 12 shows the entire hydraulic scheme of the electrohydraulic drive.

Figure 13:
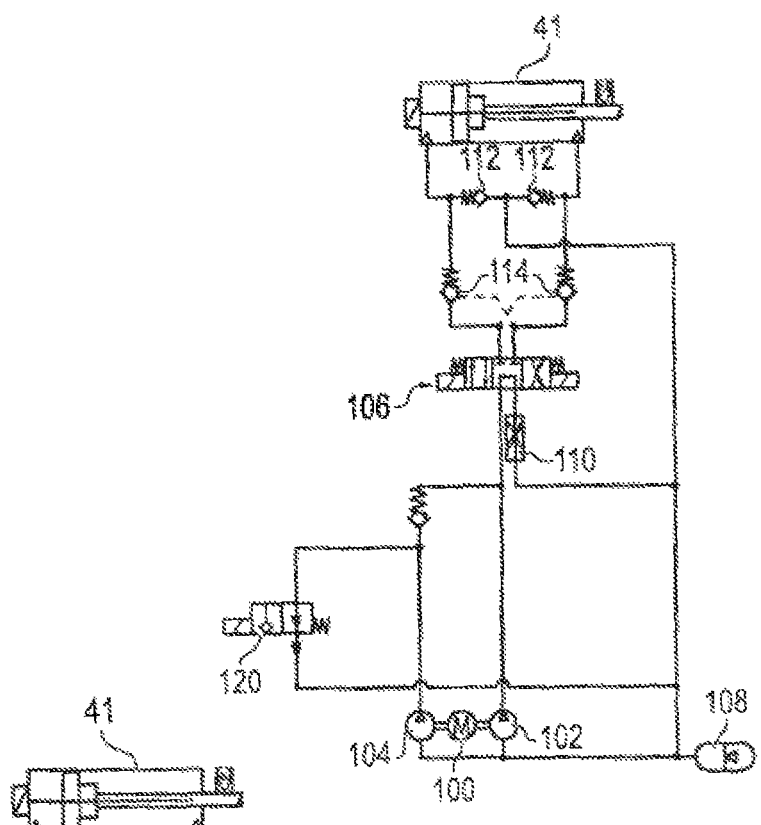
FIG. 13-FIG. 15 shows details of the hydraulic scheme according to FIG. 12 for explaining the invention.
Figure 14:
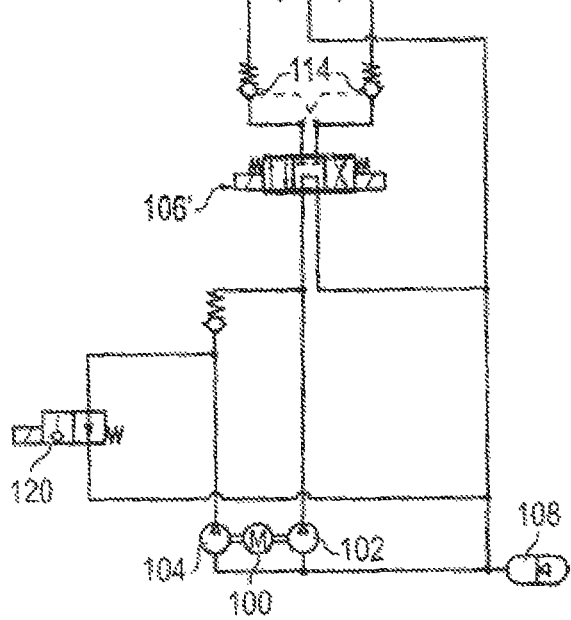
Figure 15:
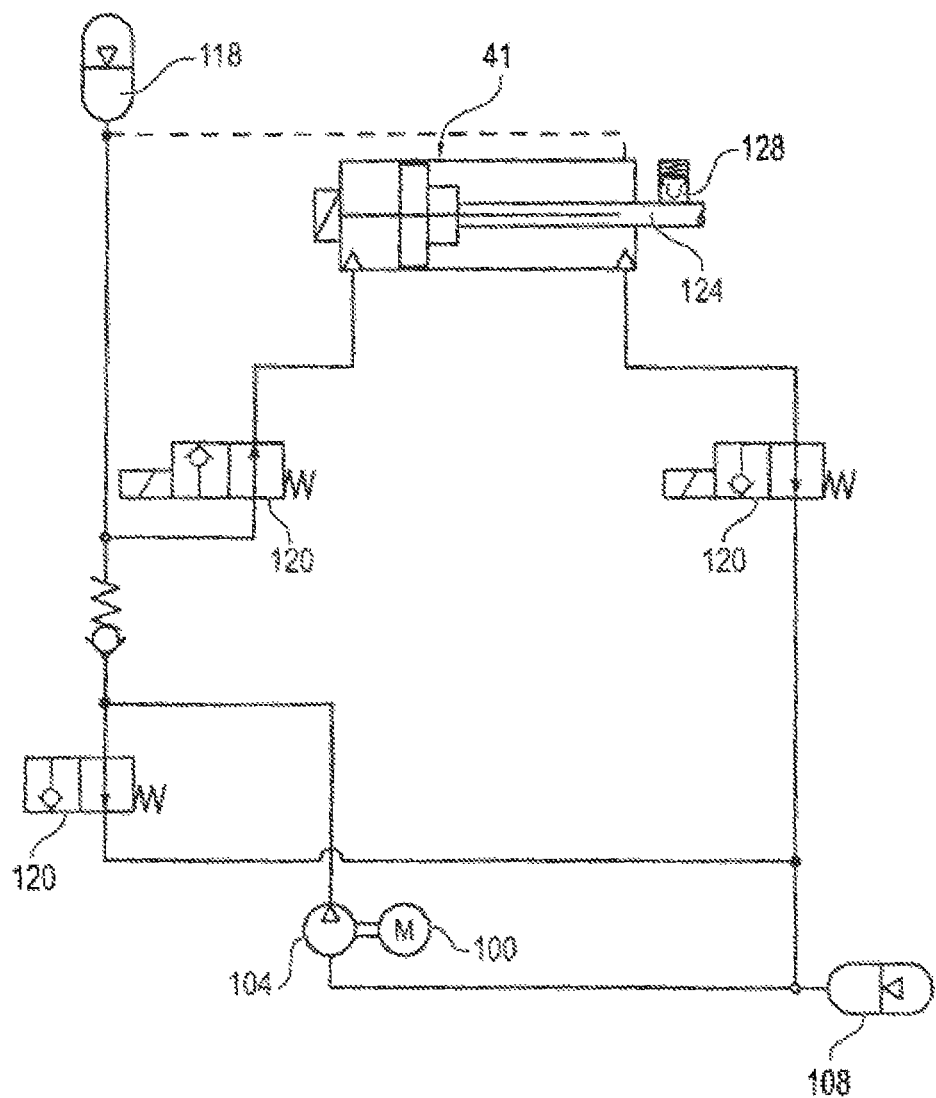

The FIGS. 13, 14 and 15 show details of this hydraulic scheme. The function of the hydraulic scheme is explained in detail using these detailed views. The FIGS. 13 and 14 serve at first for describing the control or regulating of the differential cylinder 41. An electromotor 100 that is a non-regulated electromotor with only one direction of rotation serves to produce pressure. It drives a first pump 102 and, if required, another pump 104. Even other pumps can be driven in a manner not represented here in detail. The use of several pumps 102, 104 makes possible an actuator adjustment with different adjustment speeds, as a result of which the motor drive moment can be reduced at high loads. In the case of high loads the work is carried out only with one pump. In order to limit the running speed under tractive load a current regulating valve 110 in integrated between a 4-3-way valve 106 and a low pressure tank 108. The regulating of the actuator position takes place via the 4-3-way valve 106. A load stop valve is optionally connected in between the differential cylinder 41 and the 4-3-way valve 106 serving as control valve in order to minimize the leakage of the differential cylinder 41 in case of hardship.

Non-return valves connected to the tank 108 are designated by 112. Non-return valves that can be unlocked are designated by 114. 116 is a 2-2-seat valve.

FIG. 14 shows an embodiment that differs slightly from the one according to FIG. 13. Instead of the 4-3-way valve 106 used in the embodiment according to FIG. 13 in combination with a current regulating valve 110, in the embodiment variant according to FIG. 14 a 4-3-way proportional valve or -servovalve is used. Therefore, a more gentle switching behavior, that can be required in the case of high inertias of mass of the blade, and a limiting of the running speed can be realized by defined regulating algorithms.

FIG. 15 shows the part of the hydraulic that is responsible for the backup system and the locking.

As can be gathered from FIG. 15, a high-pressure reservoir 118 can be loaded by a pump 104 driven by the electromotor 100. The 2-2-seat valves 120 carry current at 100%. Locking bolts are coupled to the backup system represented here in such a manner that they do not open until when the high-pressure reservoir has been pretensioned to operating pressure.

Upon a loss of electrical energy the high-pressure reservoir is connected via a 2-2-path seat valve 120 to the exit chamber and the entrance chamber 2-2-path seat valve 120 is connected via another one to the tank 108. Therefore, the cylinder is automatically moved out and positioned in the so-called "feathered position". Upon a drop of the pressure level in the high-pressure reservoir 118, appropriate locking bolts are lowered. The entire hydraulic scheme according to FIG. 12, that is composed by the partial hydraulic schemes according to the FIGS. 13 and 14 and 15, therefore makes it possible that in order to generate pressure a non-regulated electromotor without power electronics is used that has only one direction of rotation. A reversal of the direction of rotation of the electromotor is not required since an appropriate valve 106 is provided for reversing the direction of travel of the hydraulic cylinder. Different adjustment speeds of the at least one hydraulic cylinder are realized by hydraulically cutting in or out at least one additional pump. If a continuous adjustment should be necessary, the valve 106 can be replaced by a proportional valve. As a result, the power electronics can be eliminated.

In contrast to other known actuators, the actuator used here is equipped with a lock, as a result of which the external lock that is otherwise customary can be dispensed with. The loosening of the lock is directly coupled to the pressure of an emergency reservoir 118, which ensures that the system can only enter into operation when the emergency reservoir is charged to maximum pressure. An additional valve can be dispensed with here. In order to reduce the energy requirement one cylinder chamber of the adjustment cylinder 41 is always directly connected to the pump 102 and the other one to the tank 108 by a 4-3-way valve 106 (in contrast to other known systems). In order to regulate different speeds, two or more pumps 102, 104 driven by the same motor 100 are used. They are cut in or out as required by switchable bypass valves. In order to lower the peak load, the additional pumps are only cut in when the applied outer load is below a defined value. The regulation can take place either as a function of the path or of the pressure.

Figure 16:
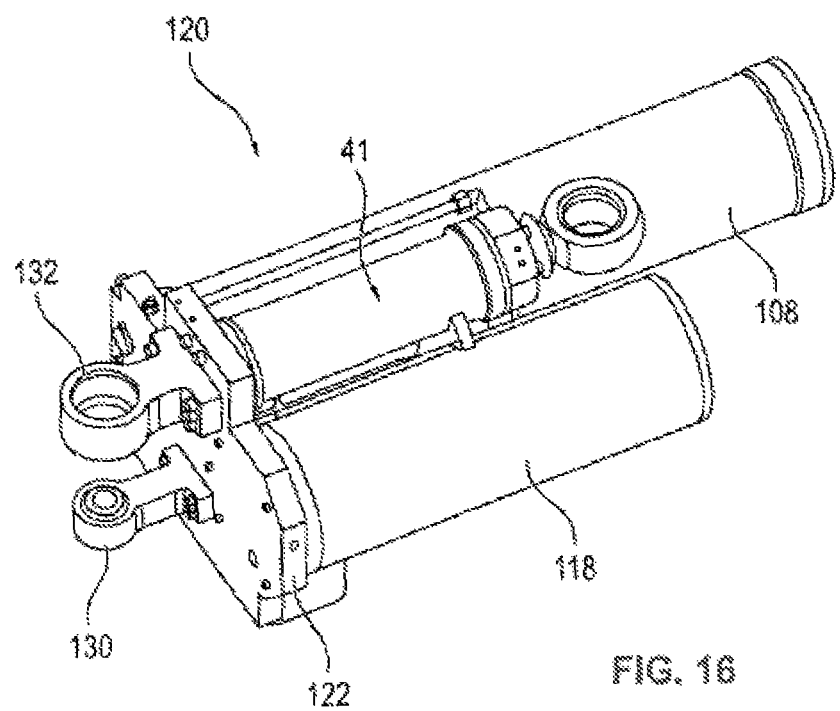
FIG. 16 shows a perspective view of the actuator according to the present invention.
Figure 17:
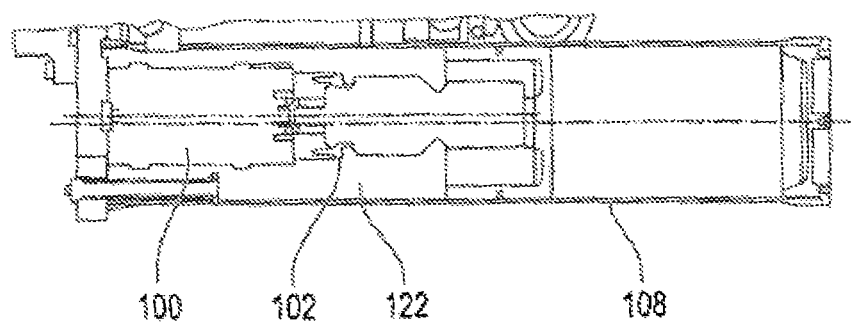
FIG. 17 shows a view of a section through a part of the actuator according to FIG. 16.

FIGS. 16 and 17 show the structural form of an electrohydraulic actuator 120 according to the present invention. The individual elements are mounted here on a central valve plate 122 and connected to each other by it. The view according to FIG. 16 shows the tank 108 and the reservoir 118.

The sectional view according to FIG. 17 shows the tank 108, in which hydraulic fluid 122 stands under pressure, and in which the electromotor 100 and the hydraulic pump 102 are directly installed. As a result of this construction the motor 110 is oil-cooled and can therefore be built to be smaller.

Figure 18:
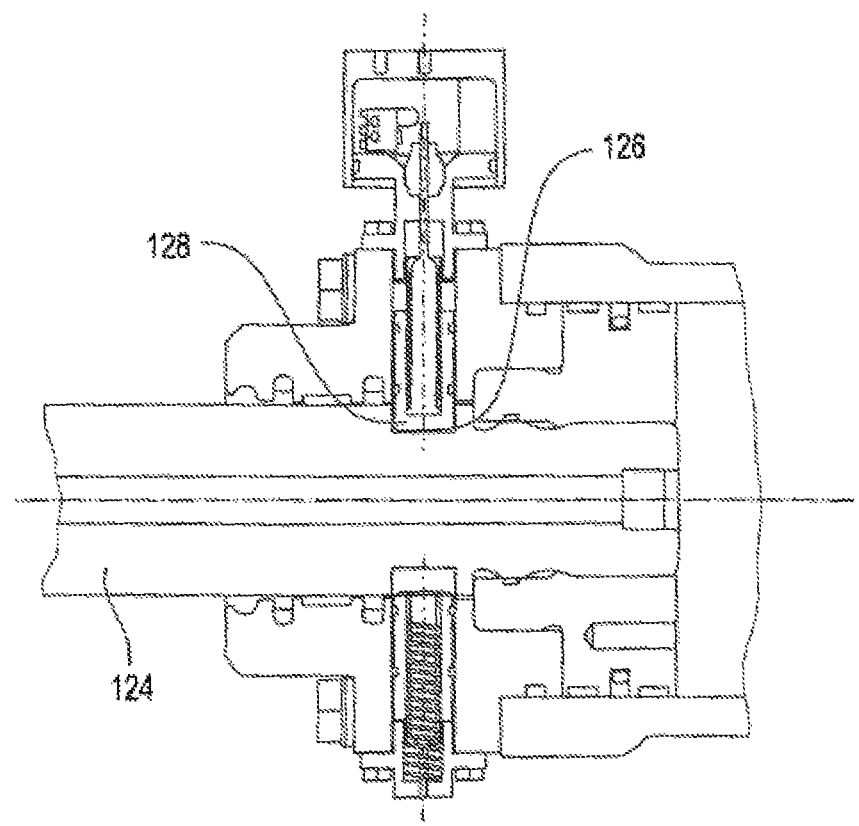
FIG. 18 shows another view of a section through a detail of the actuator according to FIG. 16.

FIG. 18 shows another detail. A sectional view through the piston cylinder arrangement 41 is shown here. As can be seen here, a recess 126 is provided in the piston rod 124 into which a locking bolt 128 can engage. Additionally, a position recognition system consisting of a sensor and a switch is provided on the locking bolt which system detects the position of the locking bolt 128. This ensures that the display for the locked state only takes place when the cylinder is actually in a secure position.

As can be seen from FIG. 16, an additional support bearing 130 is provided on the bottom of the valve plate 122 in order to prevent a wobbling of the actuator 120 during the rotation of the rotor, which is not shown in detail here. The support bearing 130 is designed to have low rigidity, which ensures that the axial forces of the cylinder are introduced via the main support 132 into the rotor structure while the support bearing only receives the components of the forces of weight and/or of mass that produce a torque about the axis of the hydraulic cylinder.

The invention claimed is:

1. A wind energy system comprising at least one pitch adjustment system for adjusting a pitch of at least one rotor blade of the wind energy system, wherein the pitch adjustment system comprises at least one electrohydraulic drive with at least one hydraulic cylinder, at least one hydraulic reservoir, at least one adjustment valve, at least one electromotor pump unit, and at least one control unit wherein the at least one hydraulic cylinder and the at least one hydraulic reservoir are combined and arranged in a device, or arranged on a rotor of the wind energy system,
   wherein the electrohydraulic drive comprises at least one unregulated electromotor that rotates in one direction of rotation for generating pressure,
   wherein the hydraulic cylinder of the electrohydraulic drive comprises a lock including at least one locking bolt configured to engage at least one recess in a piston rod of the hydraulic cylinder, and
   wherein a mechanism for loosening the lock is directly coupled to a pressure of the hydraulic reservoir such that loosening of the lock occurs when the hydraulic reservoir is charged to a given pressure.

2. The wind energy system according to claim 1, wherein the at least one locking bolt includes a position recognition system for detecting its position.

3. The wind energy system according to claim 1, further comprising at least two electromotor pump units and at least two switchable bypass valves, each of the at least two switchable bypass valves configured with a first position configured to fluid connect one of the at least two electromotor pump units to the hydraulic cylinder and a second position configured to isolate the hydraulic cylinder from one of the at least two electromotor pump units, wherein the at least two electromotor pump units and the at least two switchable bypass valves are further configured to control an adjustment speed of the pitch of the at least one rotor blade of the wind energy system.

4. The wind energy system according to claim 3, wherein two or more of the at least two electromotor pump units provide hydraulic pressure to the hydraulic cylinder if an applied external load is below a given threshold value.

5. The wind energy system according to claim 1, wherein during movement of the hydraulic cylinder, a first cylinder chamber is in fluid connection to the at least one electromotor pump unit and a second cylinder chamber is connected to the hydraulic reservoir.

6. The wind energy system according to claim 1, wherein the at least one hydraulic reservoir is charged to a pressure that is elevated in comparison to a pressure of a hydraulic system.

7. The wind energy system according to claim 1, wherein hydraulic components of the electrohydraulic drive are arranged on a central valve plate.

8. The wind energy system according to claim 1, wherein an electromotor and a hydraulic pump of the electromotor pump unit are located in a pre-tensioned tank of the hydraulic reservoir.

9. The wind energy system according to claim 1, further comprising an additional support bearing with low rigidity constructed on a bottom surface of the electrohydraulic drive such that axial forces of the hydraulic cylinder of the electrohydraulic drive are introduced via a main support into a hub structure, wherein the additional support bearing receives only components of the force of weight that generate a torque about an axis of the hydraulic cylinder.

10. The wind energy system according to claim 1, further comprising at least two rotor blades that are arranged on the rotor, wherein each of the at least two rotor blades is associated with a hydraulic adjustment unit.

* * * * *